(12) United States Patent
Kraus et al.

(10) Patent No.: US 10,889,155 B2
(45) Date of Patent: Jan. 12, 2021

(54) DEVICE FOR ADJUSTING THE HEIGHT OF A MOTOR VEHICLE BODY

(71) Applicant: Schaeffler Technologies AG & Co. KG, Herzogenaurach (DE)

(72) Inventors: Markus Kraus, Rosstal (DE); Christian Harkort, Erlangen (DE); Szilard Josvai, Oberreichenbach (DE); Michael Loos, Schwabach (DE)

(73) Assignee: Schaeffler Technologies AG & Co. KG, Müllheim (DE)

( * ) Notice: Subject to any disclaimer, the term of this patent is extended or adjusted under 35 U.S.C. 154(b) by 0 days.

(21) Appl. No.: 15/777,780

(22) PCT Filed: Nov. 10, 2016

(86) PCT No.: PCT/DE2016/200516
§ 371 (c)(1),
(2) Date: May 21, 2018

(87) PCT Pub. No.: WO2017/084664
PCT Pub. Date: May 26, 2017

(65) Prior Publication Data
US 2018/0334003 A1    Nov. 22, 2018

(30) Foreign Application Priority Data
Nov. 19, 2015 (DE) .......................... 10 2015 222 873

(51) Int. Cl.
*B60G 11/16* (2006.01)
*F16B 5/02* (2006.01)
(Continued)

(52) U.S. Cl.
CPC .............. *B60G 11/16* (2013.01); *B60G 17/00* (2013.01); *F16B 5/0275* (2013.01);
(Continued)

(58) Field of Classification Search
CPC ................... B60G 11/16; B60G 17/00; B60G 2206/8207; B60G 2202/40;
(Continued)

(56) References Cited

U.S. PATENT DOCUMENTS 3,897,713 A * 8/1975 Gugle ................... F16B 5/0275
411/389
7,922,181 B2 * 4/2011 Hakui .................. B60G 15/063
267/175
(Continued)

FOREIGN PATENT DOCUMENTS

CN          1478029      2/2004
CN          201970957    9/2011
(Continued)

*Primary Examiner* — Paul N Dickson
*Assistant Examiner* — Joselynn Y Sliteris
(74) *Attorney, Agent, or Firm* — Volpe Koenig

(57) ABSTRACT

A device for adjusting the height of a motor vehicle body (3), including an actuator (1) for actuating a vertically adjustable spring seat of a suspension spring (15), characterized in that a pin (4) is provided for connecting the device to the vehicle body (3), an actuator side pin section (10) extends through a support eye (6) in a support plate (7) of the actuator (1), and an elastomer support (2) is disposed at least on the face of the support plate (7) facing the vehicle body, between the support plate (7) and a flange (9) provided on the bolt (4).

12 Claims, 1 Drawing Sheet

(51) Int. Cl.
*F16B 35/04* (2006.01)
*B60G 17/00* (2006.01)

(52) U.S. Cl.
CPC ........ *F16B 35/042* (2013.01); *B60G 2202/12* (2013.01); *B60G 2202/40* (2013.01); *B60G 2202/44* (2013.01); *B60G 2204/124* (2013.01); *B60G 2204/40* (2013.01); *B60G 2204/43* (2013.01); *B60G 2204/4404* (2013.01); *B60G 2206/8207* (2013.01); *F16B 35/041* (2013.01)

(58) Field of Classification Search
CPC ............ B60G 2204/43; B60G 2202/44; B60G 2204/124; B60G 2204/40; B60G 2202/12; B60G 2204/4404; B60G 2500/30; B60G 2204/418; F16B 5/0275; F16B 35/042; F16B 35/041
See application file for complete search history.

(56) References Cited

U.S. PATENT DOCUMENTS

| | | | |
|---|---|---|---|
| 7,922,433 B2 * | 4/2011 | Ricciardo | F16B 39/10 411/119 |
| 9,033,637 B2 * | 5/2015 | Mitrovic | F16B 5/0275 411/338 |
| 9,140,289 B2 * | 9/2015 | Sutterluetti | E05D 5/02 |
| 9,638,226 B2 * | 5/2017 | Takahashi | F16B 5/0275 |
| 9,689,511 B1 * | 6/2017 | Thornton | H02G 3/30 |
| 10,300,838 B2 * | 5/2019 | Greene | B60Q 1/0683 |
| 10,407,935 B2 * | 9/2019 | Poppen | F16B 43/001 |
| 2004/0057786 A1 | 3/2004 | Heiml | |
| 2007/0053766 A1 * | 3/2007 | Lin | F16B 5/0275 411/389 |
| 2010/0230878 A1 * | 9/2010 | Seidl | B60G 11/52 267/220 |
| 2019/0128311 A1 * | 5/2019 | Cheung | F16B 35/042 |

FOREIGN PATENT DOCUMENTS

| | | |
|---|---|---|
| CN | 103104156 | 5/2013 |
| DE | 3502579 | 7/1986 |
| DE | 102005001742 | 3/2006 |
| DE | 102009018439 | 10/2010 |
| DE | 102010036238 | 3/2012 |

* cited by examiner

DEVICE FOR ADJUSTING THE HEIGHT OF A MOTOR VEHICLE BODY

BACKGROUND

The present invention relates to a device for adjusting the height of a motor vehicle body.

From DE102005001742, for example, a device according to the prior art is known. The actuator is mounted on the vehicle body with an elastomer support in-between.

SUMMARY

The objective of the present invention is to provide a device that could be connected easily to the vehicle body.

According to the invention, this objective is solved by the device having one or more features of the invention. The device for adjusting the height of a motor vehicle body is provided with an actuator for actuating a height-adjustable spring seat of a suspension spring. A pin for connecting the device to the vehicle body is provided, which is guided with its actuator-side pin section through a support eye of a support plate of the actuator. An elastomer support is arranged at least on the vehicle body-side end of the support plate between the support plate and a flange provided on the pin.

The device according to the invention can be connected easily to the vehicle body. The pin of the device can be screwed, for example, into a vehicle body-side threaded hole. The flange receives forces acting along the axis of the suspension strut; but the elastomer support arranged between the support plate and the flange prevents or damps the transmission of vibrations of the actuator to the vehicle body. The elastomer support can be created so that it can transfer the full load acting in the suspension strut into the vehicle body. The pin can be arranged along its pin axis so that it can move relative to the support plate, so that vibrations generated by the actuator are not transferred into the pin, but instead into the elastomer support.

The support plate can be a part of a housing of the actuator, for example, a housing cover with a passage for the actuator-side pin section of the pin. The pin can be secured in that the actuator-side pin section is provided with a screw thread on which a nut is screwed that can contact a wall of the support plate, for example, of the housing cover.

The flange can be constructed on its one end for supporting the elastomer support and on its other end for supporting the pin on the vehicle body. In this way it is guaranteed that the load acting in the suspension strut along the axis of the suspension strut is reliably and safely led via the elastomer support into the flange and finally by the pin into the vehicle body. If the pin has a vehicle body-side pin shaft with screw thread, this pin shaft and/or flange can reliably and safely transfer this load into the vehicle body.

Consequently, the pin can advantageously have an actuator-side and vehicle body-side pin section each with a screw thread, wherein the flange is arranged between the two pin sections.

The pin can be screwed with its vehicle body-side pin section into a threaded hole provided on the vehicle-body side with a prescribed torque. For this purpose, the flange can be constructed as an external hexagon head, for example, for attaching a wrench. It can be sufficient to tighten the actuator with the actuator-side pin section of the pin with a comparatively significantly lower torque.

The support plate is advantageously arranged between the flange and a nut screwed onto the screw thread of the actuator-side pin section. In this way, the device is held with the actuator perfectly on the vehicle body.

The pin can have a one-part construction and can be provided with the pin sections connected rigidly to each other, wherein an elastomer part of the elastomer support is arranged on both ends of the support plate. Constructively, the device can be designed such that, for example, the support plate has a passage for the actuator-side pin section, which allows relative movements between the support plate and the actuator-side pin section. These relative movements are transmitted into the elastomer parts arranged on both sides of the support plate; in this way, the transfer of vibrations into the vehicle body due to adjustment movements of the actuator can be advantageously significantly reduced or even prevented. The elastomer parts can be constructed as washers.

The pin can have a multiple-part construction, wherein a vehicle body-side pin part has the vehicle body-side pin section with the screw thread and wherein an actuator-side pin part has the actuator-side pin section with the screw thread, and wherein the two pin parts are guided so that they can shift longitudinally relative to each other, and wherein the flange is connected rigidly to the vehicle body-side pin section. This variant has the advantage that the actuator-side pin section can be connected rigidly to the support plate. Only one elastomer support that is arranged between the support plate and the flange can be sufficient. The slight relative movements described farther below take place in this variant between the two pin parts.

BRIEF DESCRIPTION OF THE DRAWINGS

Below, the invention is explained in more detail with reference to two embodiments shown in a total of three figures. Shown are.

DETAILED DESCRIPTION

Figure 1:
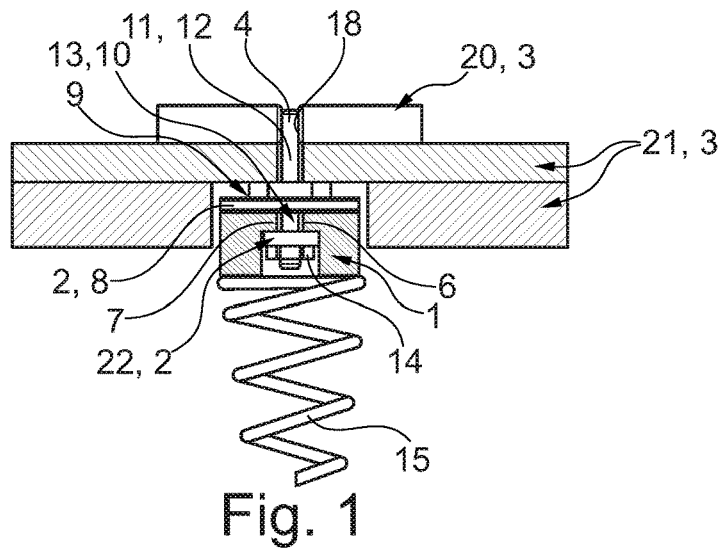
FIG. 1 a longitudinal section through a device according to the invention shown here only schematically, FIG. 2 a variant of the device from FIG. 1, and FIG. 3 an individual part from FIG. 1.

FIG. 1 shows a device for adjusting the height of a motor vehicle body 3. An actuator 1 sketched here only schematically is mounted on the vehicle body 3 with an elastomer support 2 in-between. A cut-out with a longitudinal carrier 20 and a rear-axle carrier 21 of the vehicle body 3 is sketched. The actuator is connected to a height-adjustable spring seat of a suspension spring 15 not shown here.

A pin 4 for connecting the actuator 1 to the vehicle body 3 is provided that is guided with its actuator-side pin section 10 through a support eye 6 of a support plate 7 of the actuator 1. An elastomer part 8 of the elastomer support 2 is arranged on the vehicle body-side end of the support plate 7 between the support plate 7 and a flange 9 provided on the pin 4. Another elastomer part 22 of the elastomer support 2 is arranged on the actuator-side end of the support plate 7.

The flange 9 is formed on its one end for supporting the elastomer part 8 of the elastomer support 2 and on its other end for supporting the pin 4 on the vehicle body 3. The pin 4 has an actuator-side and a vehicle body-side pin section 10, 11 each with a screw thread 13, 12, wherein the flange 9 is arranged between the two pin sections 10, 11.

The support plate 7 is arranged between the flange 9 and a nut 14 screwed on the screw thread 13 of the actuator-side pin section 10. The elastomer part 22 of the elastomer support 2 is arranged between the nut 14 and the support plate 7.

The pin 4 has a one-part construction with the pin sections 10, 11 connected rigidly to each other.

Figure 2:
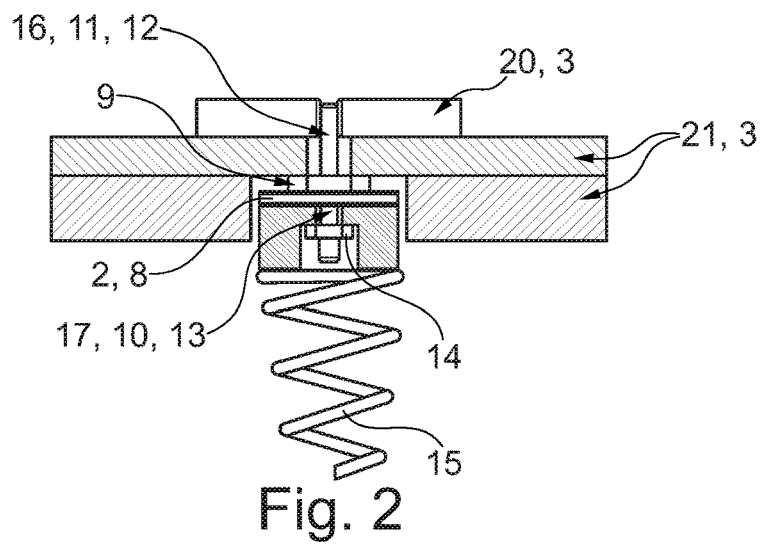

FIG. 2 shows a variant of the device according to FIG. 1. The difference consists essentially in that the pin 4 has a two-part construction and only the elastomer part 8 of the elastomer support 2 is provided. A vehicle body-side pin part 16 carries the vehicle body-side pin section 11 with the screw thread 12 and an actuator-side pin part 17 carries the actuator-side pin section 10 with the screw thread 13. The two pin parts 16, 17 are guided so that they can move longitudinally one in the other. The flange 9 is connected rigidly to the vehicle body-side pin part 16.

In the case of the first variant, the one-part pin 4 is arranged along the pin axis relative to the support plate 7. The elastomer parts 8, 22 arranged on both sides of the support plate 7 can be deformed elastically with these relative movements.

In the case of the second variant, the support plate 7 is connected rigidly to the actuator-side pin part 17 of the pin 4. The elastomer support 8 arranged between the flange 9 and the support plate 7 can be elastically deformed with relative movements between the two pin parts 16, 17.

The flange 9 of the pin 4 is formed in the two embodiments of the external hexagon head, in order to screw the pin 4 into a vehicle body-side threaded hole 18 formed in the longitudinal carrier 20 using a tool and thus to hold the device on the vehicle body 3.

Figure 3:
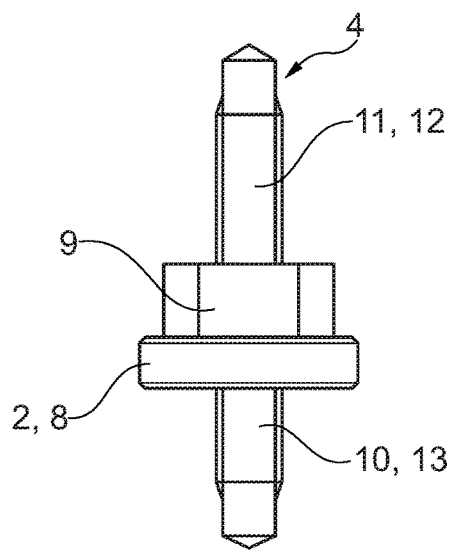

FIG. 3 shows the pin 4 described at the top of FIG. 1 as an individual part with the elastomer support 2. The elastomer parts 8, 22 are formed in both variants as washers.

REFERENCE SYMBOLS

1 Actuator
2 Elastomer support
3 Vehicle body
4 Pin
6 Support eye
7 Support plate
8 Elastomer part
9 Flange
10 Actuator-side pin section
11 Vehicle body-side pin section
12 Screw thread
13 Screw thread
14 Nut
15 Suspension spring
16 Vehicle body-side pin part
17 Actuator-side pin part
18 Threaded hole
20 Longitudinal carrier
21 Rear axle carrier
22 Elastomer part

The invention claimed is:

1. A device for adjusting a height of a motor vehicle body, the device comprising an actuator for actuating a height-adjustable spring seat of a suspension spring, the actuator including a support plate, a pin for connecting the device to the vehicle body, said pin passes with an actuator-side pin section thereof through a support eye of the support plate, and an elastomer support arranged at least on a vehicle body-side axial end of the support plate between the support plate and a flange provided on the pin.

2. The device according to claim 1, wherein the flange is configured on one end for supporting the elastomer support.

3. The device according to claim 2, wherein the flange is configured on an other end thereof for supporting the pin on the vehicle body.

4. The device according to claim 1, wherein the pin has a vehicle body-side pin section, and the actuator-side pin section and the vehicle body-side pin section each include a screw thread, and the flange is arranged between the actuator-side and the vehicle body-side pin sections.

5. The device according to claim 4, wherein the support plate is arranged between the flange and a nut screwed on the screw thread of the actuator-side pin section.

6. The device according to claim 4, wherein the pin has a one-part construction and is provided with the actuator-side and the vehicle body-side pin sections connected rigidly to each other, and an elastomer part of the elastomer support is arranged on each of the vehicle body-side axial end and an opposite axial end of the support plate.

7. The device according to claim 4, wherein the pin has a multiple-part construction including a vehicle body-side pin part which includes the vehicle body-side pin section with the screw thread, and an actuator-side pin part which includes the actuator-side pin section with the screw thread, the actuator-side and the vehicle body-side pin parts are guided for movement longitudinally relative to each other, and the flange is connected rigidly to the vehicle body-side pin part.

8. A motor vehicle body adjustment device comprising:
an actuator configured to adjust a height-adjustable spring seat of a suspension spring, the actuator including a support plate,
a pin configured to connect the actuator to a vehicle body, and
an elastomer support arranged at least on a vehicle body-side axial end of the support plate between the support plate and a flange provided on the pin.

9. The device of claim 8, wherein the pin has a vehicle body-side pin section and an actuator-side pin section, each including a screw thread, the actuator-side pin section passes through a support eye of the support plate, and the flange is arranged between the actuator-side and the vehicle body-side pin sections.

10. The device of claim 9, wherein the elastomer support includes a first elastomer part arranged between the support plate and the flange, and a second elastomer part arranged between the support plate and a nut screwed on the screw thread of the actuator-side pin section.

11. The device of claim 10, wherein the pin has a one-part construction and is provided with the actuator-side and the vehicle body-side pin sections connected rigidly to each other.

12. The device of claim 10, wherein the pin has a multiple-part construction including a vehicle body-side pin part which includes the vehicle body-side pin section and an actuator-side pin part which includes the actuator-side pin section, the actuator-side and the vehicle body-side pin parts are longitudinally moveable relative to each other in an axial direction of the pin, and the flange is connected rigidly to the vehicle body-side pin part.

\* \* \* \* \*